June 26, 1962   H. J. LOVEGROVE   3,041,438
ELECTRIC HEATING CONTROL DEVICES
Filed May 13, 1959   3 Sheets-Sheet 1

INVENTOR
Henry Joseph Lovegrove
BY
Brown, Jackson, Boettcher & Dienner
ATTORNEYS June 26, 1962 H. J. LOVEGROVE 3,041,438
ELECTRIC HEATING CONTROL DEVICES
Filed May 13, 1959 3 Sheets-Sheet 2

INVENTOR
Henry Joseph Lovegrove
BY
Brown, Jackson, Boettcher & Dienner
ATTORNEYS June 26, 1962 H. J. LOVEGROVE 3,041,438
ELECTRIC HEATING CONTROL DEVICES
Filed May 13, 1959 3 Sheets-Sheet 3

INVENTOR
Henry Joseph Lovegrove
BY
Brown, Jackson, Boettcher & Dienner
ATTORNEYS.

United States Patent Office 3,041,438
Patented June 26, 1962

3,041,438
ELECTRIC HEATING CONTROL DEVICES
Henry Joseph Lovegrove, Hadley Wood, Barnet, England, assignor to Sangamo Electric Company, Springfield, Ill., a corporation of Delaware
Filed May 13, 1959, Ser. No. 812,941
Claims priority, application Great Britain May 16, 1958
6 Claims. (Cl. 219—20)

This invention relates to arrangements for controlling space heating by means of electrically energised storage heaters and has as its object the provision of an improved system by which the amount of electrical energy drawn from the supply mains for storage purposes during an "off-peak" period is subject to regulation in accordance with external atmospheric conditions so as to adjust the total amount of energy stored in accordance with the anticipated heating requirements during the subsequent heat release period.

It has been standard practice for some considerable time to control the temperature within a building by means of thermostatic switches located within the building, which switches cause the supply to electric heating means to be cut off when some previously selected room temperature is reached. While such method has proved reasonably satisfactory in the past, more especially for small buildings, it is becoming increasingly necessary, particularly in the case of large buildings, to employ some system of control in which the heat input to the building is directly related to the rate of heat extraction from the building due to external atmospheric conditions. The above-mentioned simple thermostatic switch system is virtually unusable when storage type heaters are employed and the energy required for heating during each day period is drawn from the electric supply mains during the preceding night or "off-peak" period when a cheaper supply tariff can be obtained and when the applied load of such storage heaters is of advantage in maintaining a more constant load on the generating equipment.

One object of the present invention is to provide an improved control system by which the amount of energy applied to the heating means, such as storage type space heaters, during a chosen time period, for instance a night or "off-peak" period, can be controlled to avoid unnecessary heat storage and/or to achieve a better balance of temperature within the heated space during the subsequent heat release or utilization period.

The invention is based upon the, normally legitimate, assumption that the rate of heat extraction from a building during the first, or storage, e.g. night period is a reasonably reliable indication of the amount of heat which will be required in the immediately following second, or release, e.g. daytime, period.

According to the present invention an electric heating control arrangement for a storage type heating device comprises a temperature sensing device including a thermostatically controlled switch and an adjacent electric heater, said switch being arranged to be sensitive to a balance between any heat loss therefrom due to the ambient temperature and the heat input thereto from said electric heater, said thermostatic switch being arranged to control the supply of heating current to said storage type heating device and means for supplying to said heater of said temperature sensing device during the heat storage period, an amount of heating energy which changes progressively from the beginning to the end of said heating storage period.

In a preferred arrangement according to the invention the heating energy supplied to the heater of said temperature sensing device is arranged to decrease linearly from a maximum value at the beginning of the heating storage period to a minimum value at the end of the heating storage period. Such variable energy supply is conveniently in the form of recurrent electric current pulses at regular time intervals, the duration of the successive pulses being progressively decreased from the beginning to the end of the heat storage period.

In order that the nature of the invention may be more readily understood embodiments thereof will now be described with reference to the accompanying drawings in which:

FIGURE 5 is a fragmentary perspective view showing a modification while

Figure 1:
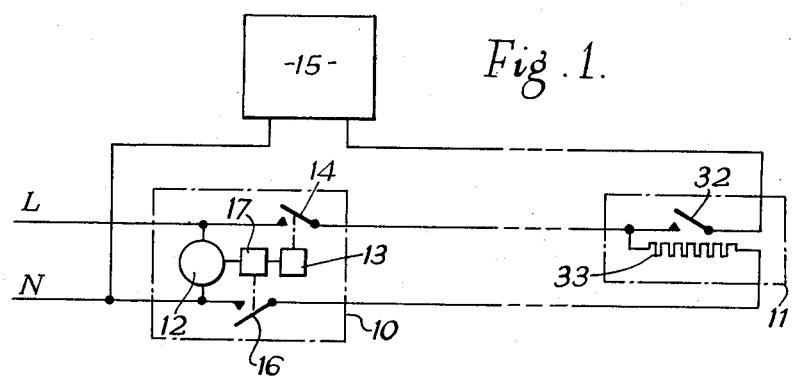
FIGURE 1 is a schematic diagram illustrating one general form of arrangement according to the invention.

Referring first to FIGURE 1, the control arrangements comprise, essentially, two units in the form of a combined time and pulsing switch 10 and an external temperature probe 11. These control the supply of energy to a storage type heating means 15. The combined time and pulsing switch 10 is located inside the building and comprises a substantially conventional time switch mechanism consisting of a synchronous electric motor 12 continuously connected across the alternating current supply mains L, N and driving, through a suitable reduction gear train, cam or equivalent mechanism 13 which controls the opening and closing of main switch contacts 14, the times of closing and opening of such main switch contacts being adjusted in the usual way to define the beginning and end respectively of the night or "off-peak" period when the supply of energy at a cheaper tariff is available. In addition, such time and pulsing switch 10 is provided with a further pair of pulsing contacts 16 which are also driven through cam or equivalent mechanism 17 from the motor 12 and are arranged to provide a continuous and repetitive short duration switching cycle of, say, 5 minutes' duration. In addition such pulsing contacts 16 are arranged to provide a graduated and progressively changing ratio of the respective time durations of the "on" and "off" periods of each switching cycle period during, at least, that time period when the main switch contacts 14 are closed. Thus, at the beginning of the aforesaid "off-peak" period for supply to the storage heater means 15, marked by the instant of closure of the main switch contacts 14, each pulsing cycle of the contacts 16 will be as shown at (a) in FIG. 3 with a closure time $e^1$ occupying nearly the whole of the (5 minute) pulsing cycle time $t$. At the end of the "off-peak" supply period $p$ i.e. immediately before reopening of the main switch contacts 14, each pulsing cycle of the contacts 16 will be as shown at (c) with a closure time $e^3$ during each cycle time $t$ which is reduced almost to zero. At the middle of the "off-peak" supply period, shown at (b) in FIG. 3, the closure time $e^2$ is substantially one half of the cycle time $t$. The ratio of the "on" to the "off" period in each cycle changes progressively throughout the total supply period $p$.

Figure 2:
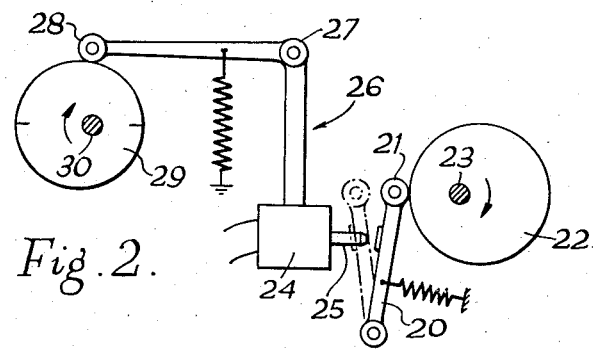
FIGURE 2 is a largely schematic view of a particular pulse switching section of the time control device of the arrangement.

Such pulse switching may be effected by means as illustrated in FIG. 2 comprising a pivoted lever arm 20 carrying a cam follower roller 21 in engagement with an eccentric cam disc 22 secured to a shaft 23 which is arranged to be rotated by the motor 12 once every five minutes. Such lever arm 20 is adapted to engage, during each oscillation, with the operating plunger 25 of switch means 24 which includes the pulsing contacts 16, FIG. 1. The switch means 24 is mounted upon a bell crank or other lever 26 pivoted at 27 and carrying a further cam follower roller 28 in engagement with a second eccentric cam disc 29 secured to a shaft 30 also driven by the motor 12 but at the slower rate of one revolution every 24 hours or complete calendar day period.

Figure 3:
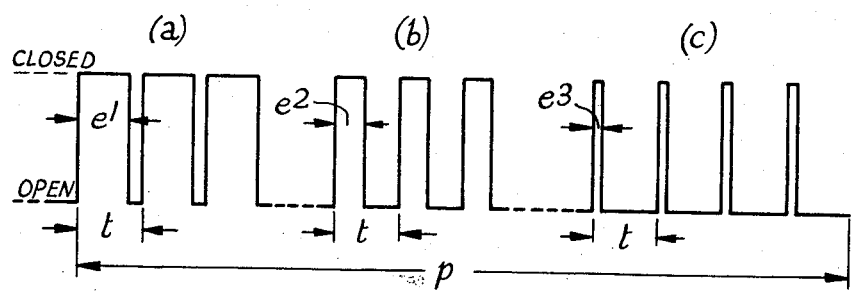
FIGURE 3 is a timing diagram illustrating the manner of operation of the pulse switching elements shown in FIG. 2.

The shaping and timing position of the cam disc 29 is so adjusted that the pulsing switch means 24 is gradually moved away from the switch operating lever arm 20 during the closure period of the main switch contacts 14, FIG. 1, thus progressively reducing the switch closure time of the switch means 24 during each rotation cycle of the cam disc 22 to give the progressive change of the on/off ratio as indicated in FIG. 3.

The external probe 11, FIG. 1, comprises a thermostatically controlled switch 32 and a small, suitably lagged, electric heater 33, located within a common housing. The heater 33 is supplied with energy by way of the pulsing switch contacts 16. The temperature of the switch 32 and, accordingly, the switch position (i.e. open or closed) depends upon the relationship between the heat input to such switch from the heater 33 and the heat extraction from such switch due to external atmospheric conditions. The heat input is controlled by the pulsing switch contacts 16 and therefore varies in predetermined and progressively decreasing manner as already described from a maximum value at the beginning of the "off-peak" time period marked by the closure of the main switch contacts 14 to a minimum value at the end of such "off-peak" period marked by the reopening of the contacts 14.

The thermostatic switch 32 is adjusted to open its contacts when its temperature rises to some specified value and the maximum heating rate provided by the heater 33, i.e. when the pulsing cycle is as shown at (a) in FIG. 3 at the beginning of the "off-peak" period, is arranged to be such that, with maximum external cooling, such specified temperature is not quite reached. This results in a continuous current supply to the storage heater means 15 for the whole of the "off-peak" or switch-closed period of the main switch contacts 14 when the external cooling conditions are at a maximum. As the external cooling rate becomes less and less so the switching-on of the storage heater means 15 becomes delayed until later and later during the off-peak or switch-closed period of the main switch contacts 14.

The operation of the arrangement is as follows. At the beginning of the "off-peak" period, the main time switch contacts 14 close and the pulsing contacts 16 then become effective to supply current pulses (as at (a) in FIG. 3) to the heater 33 in the external probe 11. It will be assumed that, at the moment of switching on by the main switch contacts 14, the thermostatic switch 32 in the external probe is at a temperature below the aforesaid specified operating temperature. The contacts of such switch 32 are therefore in the closed condition and the load comprising the storage heater means 15 will be supplied with current from the supply mains immediately the main switch contacts 14 close. This supply will be maintained until the heater 33 succeeds in raising the temperature of the thermostatic switch 32 to above the aforesaid specified operating value. In practice, the duration of this first load switch-on period is relatively short except under conditions of maximum or near maximum external cooling. When the cut-out or operating temperature of the thermostatic switch 32 is reached, the load 15 is switched off and then remains off if the thermostatic switch temperature continues to rise due to the heat input from the heater 33 being greater than the heat extraction due to the external cooling. The temperature of the thermostatic switch 32 will rise to some maximum value and then, as the heat input from heater 33 gradually diminishes due to the progressively reducing "on" period of each switching cycle of the pulsing contacts 16, the thermostatic switch temperature will gradually fall again in dependence upon the external cooling rate until the aforesaid specified operating temperature is again reached. The thermostatic switch 32 therefrom closes and the storage heater means 15 is switched on again and thereafter remains switched on until the end of the off-peak period marked by the reopening of the main contacts 14 unless there should be a sudden and rapid fall in the external cooling rate, i.e. rise of external temperature.

Figure 4:
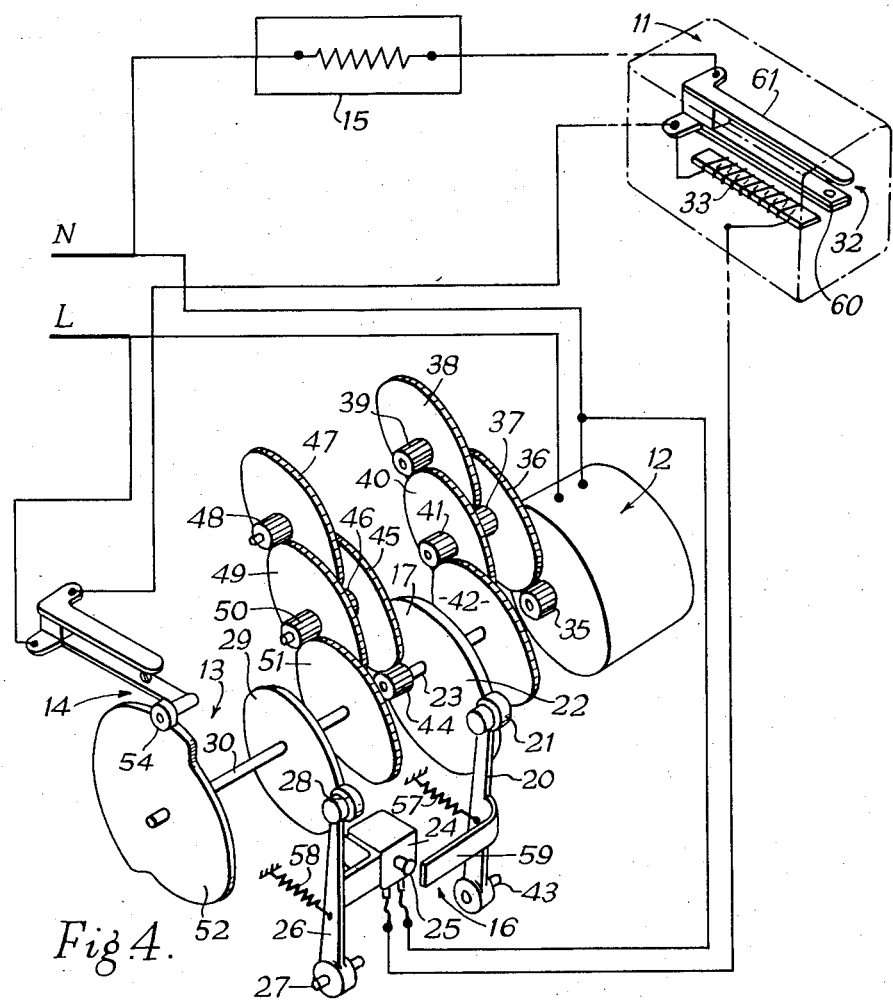
FIGURE 4 is a part-perspective, part-schematic view showing one constructional form of the arrangements according to the invention.

Referring now to FIG. 4 which illustrates in perspective and largely schematic form one constructional arrangement according to the invention, the synchronous motor 12 is arranged to drive the cam mechanism 17 by way of a reduction gear train comprising pinion 35 on the motor spindle, gear wheel 36 with interconnecting pinion 37, gear wheel 38 with interconnected pinion 39, gear wheel 40 with interconnected pinion 41 and gear wheel 42 secured to the shaft 23. Rigidly secured to the shaft 23 is the eccentric cam disc 22 which operates upon the cam follower roller 21 carried by the free end of the lever arm 20 pivotally mounted at its opposite end on a pivot staff 43. In this drawing figure, all bearing supports for the various shafts and spindles have been omitted in the interest of clarity.

To the shaft 23 is also secured pinion 44 forming part of a further reduction gear train for driving the cam mechanism 13 and consisting of a gear wheel 45 with interconnected pinion 46, gear wheel 47 with interconnected pinion 48, gear wheel 49 with interconnected pinion 50 and gear wheel 51 secured to the further shaft 30 which may be, but is not necessarily disposed coaxial with the shaft 23.

To this further shaft 30 is rigidly secured the eccentric cam disc 29 operating by its periphery on the cam follower roller 28 pivotally mounted at the free end of the lever arm 26 rockable about the pivot staff 27.

To the same shaft 30 is rigidly secured a further contoured cam disc 52 having a rise or proud portion 53 which serves to determine the "off-peak" period when current supply at the preferential tariff rate is available. This cam disc 53 is engaged by a cam follower roller 54 carried by the free end of a switch blade 55, which in conjunction with an opposing switch blade 56 constitutes the main switch contacts 14 previously referred to.

The lever arm 20 is continuously biased by spring means 57 to urge cam follower roller 21 towards the periphery of the cam disc 22 while a similar spring means 58 operates to urge the cam follower roller 28 on the lever arm 26 towards the cam disc 29. In consequence, the aforesaid lever arms 20 and 26 will continuously oscillate backwards and forwards in accordance with the contour of the associated cam discs the lever arm 20 oscillating once every 5 minutes and the lever arm 26 once every 24 hours. To the lever arm 20 is attached a transverse abutment piece 59 whose free end can, under certain conditions, engage the operating plunger 25 of the pulsing switch means 24, which latter is rigidly secured to and moved by the lever arm 26.

The external temperature sensing probe 11 is illustrated in FIG. 4 as comprising switch means 32 consisting of a bi-metal switch blade 60 and a co-operating parallel non-bi-metal switch blade 61 carrying opposed contacts which engage whenever the temperature of the bi-metal blade 60 is below the aforesaid predetermined or specified temperature value and which open whenever the temperature of such blade 60 exceeds such predetermined value. Adjacent to the bi-metal blade 60 is arranged the heater coil 33.

The wiring arrangement of the system shown in FIG. 4 is identical with that illustrated in FIG. 1, the storage heater or load device 15 being connected between one of the mains input leads N and the switch blade 61 of the external heat sensitive probe switch 32. The opposite bi-metal switch blade 60 is connected to the opposite main supply lead L by way of the main switch contacts 14 so that whenever the probe switch 32 is closed during an "off-peak" period, heating energy will be supplied to the storage heater 15.

The heater coil 33 of the external temperature probe switch 11 is connected at one end to the terminal which is also associated with the bi-metal blade 60 while its opposite end is conected to one side of the switch means 24. The opposite terminal of which this switch means 24 is connected to the opposite mains lead N. The synchronous motor 12 is energized continuously at all times by direct connection across the input supply leads N and L.

By appropriate design of the reduction gear train 35, 36 . . . 42 with relation to the rotor speed of the synchronous motor 12, the cam disc 22 is arranged to rotate at a speed of, say, one revolution every five minutes. Similarly, by appropriate design of the further reduction gear train 44, 45 . . . 51, the shaft 30 and the cam disc 29 and 52 carried thereby are arranged to rotate at a speed of one revolution every 24 hour or day period.

The angular position of the cam disc 52 is so adjusted that the main switch contacts 14 close at an appropriate time, for instance, 7 p.m. and reopen again at a later time instant, for instance, 7 a.m., the intervening period being the so-called "off-peak" period when the electricity supply at the preferential tariff rate is made available for the selective purpose of energizing the load device such as the storage heater 15.

The cam disc 29 on the shaft 30 is so positioned that its greatest radius point will lie opposite the cam follower roller 28 at the time when the leading edge of the rise portion 53 of the cam disc 52 is about to close the main switch contacts 14 whereas its opposite, least radius point will lie opposite the cam follower roller 28 at or after the instant when the aforesaid cam disc 52 has re-opened the main switch contacts 14. As already stated, the cam disc 22 rotates once every five minutes and in so doing oscillates the lever arm 20 to bring abutment piece 59 thereon repeatedly towards and away from the switch operating plunger 25. At the beginning of the off-peak or current supply availability period, the switch means 24 will be in the position nearest the path of the abutment piece 59 and, as a result, such abutment piece will engage the plunger 25 and will close the switch 24 almost immediately after the cam follower roller 21 has passed over the maximum radius point of the cam disc 22 and will not move away from the plunger 25 again to reopen the switch means 24 until just before the same maximum radius point of the cam disc 22 is again coming opposite to cam follower roller 21. As a result the switch 24 is repeatedly opened and closed with the closed periods occupying nearly all of the five minute cycle time and the switch open periods occupying only the very small remaining portion of such five minute cycle time. Later, when the cam disc 29 has moved forwardly so that the radius of the point thereof in engagement of the cam follower roller 28 is now less than before, the switch means 24 will be withdrawn somewhat from the path of the abutment piece 59 and the latter will have to move further towards the shaft 23 in order to contact the plunger 25 and so close the switch means 24. The point of re-opening of such switch means will be correspondingly earlier in each five minute cycle period and as a result the on periods of the switch means 24 become progressively shorter and the related off periods progressively longer. Finally, towards the end of the "off-peak" or current availability period when the least radius point of the cam disc 29 is opposite the cam follower roller 28, the switch means 24 will be withdrawn to the maximum extent from the path of the abutment piece 59, and, as a result, such abutment piece will only just reach the plunger 25 to close the switch means 24 when the least radius point of the cam disc 22 is opposite the cam follower roller 21 and will almost immediately thereafter move away again to reopen the switch means 24 whereby the on periods now constitute only a very small part of, and the off periods constitute the major part of, each five minute cycle period.

Figure 6:
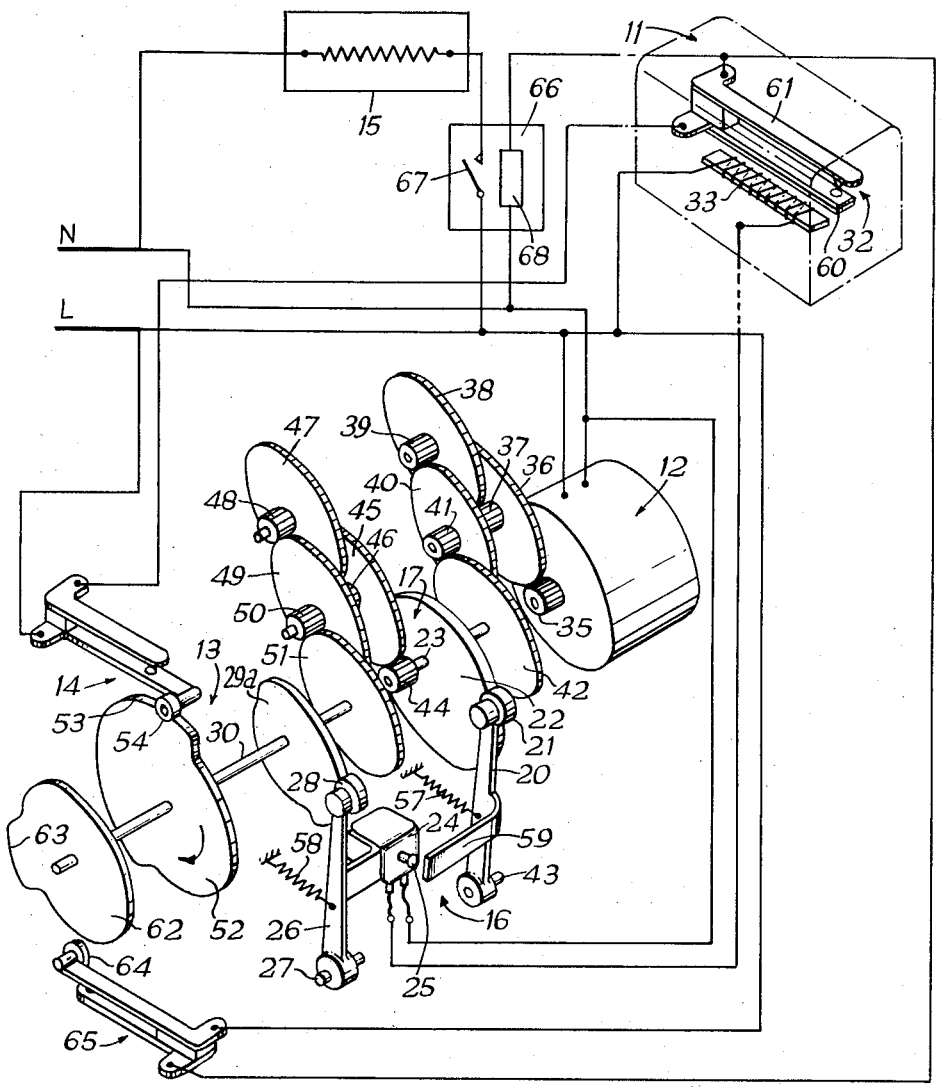
FIGURE 6 is a view similar to FIG. 4 of another modification.

If desired, the initial switching-on of the load for the very short duration of time at the beginning of the "off-peak" period referred to above can be prevented by arranging that the heater 33 within the external probe 11 is switched on for a short time period before the actual start of the "off-peak" or heat storage period as marked by the closure of the main switch contacts 14. The alternative embodiment illustrated in FIG. 6 shows one manner of providing this facility. In this figure all parts similar to those already described in connection with FIG. 4 have been indicated by like reference numerals and will not again be described in detail.

In this alternative arrangement the eccentric cam disc 29 of FIG. 4 is replaced by a cam 29a of slightly modified profile so arranged that, whereas during the majority of the daily period when the "off-peak" supply is not available, the follower roller 28 rests on a reduced radius region of its periphery such that the switch means 24 is carried by the lever 26 and is withdrawn to a position where the operating plunger 25 thereof is beyond the reach of the abutment piece 59 during the whole of each oscillation cycle of the latter. At a suitable time instant, say three hours, before the commencement of the "off-peak" or current availability period, the roller 28 engages a proud region of the cam periphery to project the switch means 24 fully into the oscillatory path of the abutment piece 59 whereby the switch means 24 is thereafter continuously operated at the 5-minute cycle time to provide maximum duration current pulses to the heater 33. The circuit of the latter is rearranged so that its supply path is from the supply main N through the switch means 24 and then direct to the related supply main L instead of being completed, as in the previous embodiment of FIG. 4, through the main switch contacts 14. As a result of this modification, for a predetermined time period immediately prior to the commencement of the "off-peak" or current availability period, the heater 33 is repeatedly supplied with long duration current pulses so as to heat the thermostatic switch 32. The probe 11 is accordingly conditioned to determine the relationship between the maximum heat input from the heater 33 and the heat loss due to external temperature conditions well in advance of the actual commencement of the "off-peak" period, so that immediately the main switch contacts 14 close, the apparatus commences to operate to provide the desired form of input control without the initial heating period previously referred to.

The modified arrangement of FIG. 6 also shows additional means for providing a boost period of current supply to the storage heater means 15 at a chosen time, such as between 1 p.m. and 4 p.m. of the actual heat release period. This may be found necessary in some circumstances where the storage capacity of the heater means 15 is insufficient to meet the full heating demand over the heat release period, or where, owing to an excessive rate of heat loss from the heated region, the provision of some additional heat input is found desirable in order to increase the rate of heat release during the later part of the heat release period.

This facility is provided by means of an additional cam 62 secured to the shaft 30. This cam is provided with a peripheral rise 63 which operates, through follower roller 64, to close further boost switch means 65 during the chosen boost period. As may be seen from the drawing, the switch means 65 serve to close a supply circuit to the heating means directly across the supply mains N, L without reference to the open or closed state of the main switch means 14 or the condition of the switch 32 of the external temperature probe 11.

In the same modification of FIG. 6 the supply circuit to the storage heater means 15 is shown as completed, not directly by way of the thermostatically controlled switch 32 of the temperature probe 11 but instead, by way of a contactor 66 which has its operated contacts 67 in the energisation circuit of the storage heater means 15 across the supply mains N, L and its operating means 68 arranged in an energisation path either by way of the thermostatically controlled switch 32 or by way of the further boost switch means 65 just referred to.

Such contactor 66 may be of any convenient kind but is preferably of a thermally operated type to permit use on alternating current without introducing a risk of vibratory noise such as may arise through the use of an operating solenoid or electromagnet energised by alternating current. The use of such contactor is also advantageous in reducing the current load through the thermostatically controlled switch 32 and the boost switch means 55 and permits the increase of capacity of the storage heater means 15 or other load to any desired value without requiring modification of the control apparatus. Such contactor 66 may conveniently be made an integral part of the apparatus structure comprising the motor 12 with its associated gear trains and switch means 14, 24 and 65.

In the preferred form of variable duration pulses switch the final pulse condition at the end of the "off-peak" period is preferably such that the energy pulses become non-existent by reduction of their duration time to zero. At the beginning of the pulse variation period the duration time of such pulses may be made equal to the full length of the 5 minute or other switching cycle period so that, in effect, they coalesce to form initially a continuous supply current, which however, very quickly becomes interrupted by progressive reduction of the time duration of each pulse.

Figure 5:
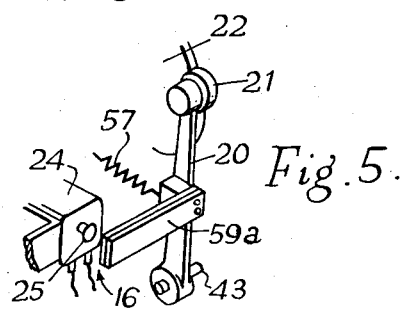

A further modification or improvement resides in providing a measure of additional control by the internal temperature of the building. This may be effected as shown in FIG. 5 by constructing the abutment piece 59a on the lever arm 20 as a bi-metal element which deflects with change of ambient temperature within the building containing the switch mechanism. Alternatively the lever arm 26 may be formed as a bi-metal or other heat sensitive member whereby the position of the switch means 24 relative to the operating lever arm 20 at any moment is dependent upon the cam 29 and the ambient temperature of the interior of the building.

It will be appreciated that the fundamental control of the invention is the application to the heater of the external temperature probe 11 of a current input which progressively changes during the off-peak or current available period for heat storage whereby, at some particular point during that period, a balance condition is achieved between the heat input from such heater and the heat loss due to external atmospheric conditions. At this point the thermostatically controlled switch 32 operates to control the supply of current to the storage heater 15. Such progressive change of current input to the heater could be effected by means other than the repetitive and variable duration pulsing arrangements so far described. For instance a rheostat or the like could be controlled by cam means equivalent to the cam disc 22 or, alternatively a small variable-ratio auto-transformer could be similarly operated. It will be apparent also that, instead of supplying the maximum value of heat input at the beginning of the off-peak or current availability period and thereafter progressively decreasing such heat input as the storage period progresses, a reversed arrangement is possible in which the heat input is at a minimum at the beginning and at the maximum at the end of the off-peak or storage period. Such form of current supply will cause the switching-on of the storage heater always at the beginning of the availability period (if any current is to be supplied thereto at all) and the switching-off of such storage heater at some variable time instant during the off-peak period. To the extent that the stored heat will begin to be released immediately after the switching-off instant which may be well in advance of the normal heat release period, such system obviously is less desirable in most instances to the one previously described in which the termination of the heat storage period coincides with the beginning of the normal useful heat release period.

Other modifications, such as by the provision of some non-linear law of variation of heat input to the heater of the temperature probe unit 11 instead of the substantially linear variation already described, will be apparent to those skilled in the art and are to be regarded as falling within the scope of the invention as defined in the appended claims.

I claim:
1. An electric heating control arrangement for regulating current flow over an energizing circuit to a storage-type heating device during a heat storage interval of predetermined duration comprising: a thermostatically-controlled switch coupled in series with said storage heating device in said energizing circuit and positioned to sense ambient temperature; electric heating means positioned adjacent said switch to provide a heat input thereto responsive to passage of current through said heating means, whereby said switch is responsive both to the heat loss therefrom due to the ambient temperature and the heat input thereto from said electric heating means; means for applying heating current to said energizing circuit; and control means coupled to said electric heating means and including a portion of said energizing circuit, said control means providing electric current to said heating means during said heat storage interval independently of the position of said switch, and said control means progressively changing from the beginning to the end of said heat storage interval, the quantity of current which it provides said heating means.

2. An electric heating control arrangement for regulating current flow over an energizing circuit to a storage-type heating device during a heat storage interval of predetermined duration comprising: a thermostatically-controlled switch coupled in series with said storage heating device in said energizing circuit and positioned to sense ambient temperature; electric heating means positioned adjacent said switch to provide a heat input thereto responsive to passage of current through said heating means, whereby said switch is responsive both to the heat loss therefrom due to the ambient temperature and the heat input thereto from said electric heating means; means for applying heating current to said energizing circuit; and control means, coupled to said electric heating means and including a portion of said energizing circuit, operative to provide pulses of electric current to said heating means during said heat storage interval independently of the position of said switch, said control means including means by which the quantity of current in said pulses is decreased linearly from a maximum value at the beginning of said heat storage interval to a minimum value at the end of said heat storage interval.

3. An electric heating control arrangement for regulating current flow to a storage-type heating device during a heat storage interval of predetermined duration comprising: first and second energizing conductors coupled to said storage-type heating device; an external temperature probe comprising a thermostatically-controlled switch and a heating resistor, one end of said resistor being coupled to one side of said switch in a common connection, the other side of said switch being coupled to said first energizing conductor; means for applying heating current to said common connection and to said second energizing conductor, whereby said storage-type heating device receives heating current whenever said switch is in the closed position; and control means, coupled to the end of said heating resistor remote from said common connection, operative to apply a signal to said heating resistor independently of the position of said switch, said signal varying gradually from the beginning to the end of said heat storage interval.

4. An electric heating control arrangement for regulating current flow to a storage-type heating device during a heat storage interval of predetermined duration comprising: first and second energizing conductors coupled to said storage-type heating device; an external temperature probe comprising a thermostatically-controlled switch and a heating resistor, one end of said resistor being coupled to one side of said switch in a common connection, the other side of said switch being coupled to said first energizing conductor; means for applying heating current to said common connection and to said second energizing conductor, whereby said storage-type heating device receives heating current whenever said switch is in the closed position; and pulse-modulation control means including a further switch, coupled to the end of said heating resistor remote from said common connection, operative to provide a signal through said resistor of gradually varying pulse width from the beginning to the end of said heat storage interval independently of the position of said switch, the width of said signal being gradually changed by a related change of the duration during which the further switch is closed.

5. An electric heating control arrangement for regulating current flow from first and second energizing conductors to a storage-type heating device having first and second electrical connections during a heat storage interval of predetermined duration comprising: an external temperature probe comprising a thermostatically-controlled switch and a heating resistor, one end of said resistor being coupled to one side of said switch in a common connection, the other side of said switch being coupled to said first electrical connection of said heating device; means for coupling said first energizing conductor to said second electrical connection of said heating device; a second switch coupled between said second energizing conductor and said common connection, to complete a circuit between said heating device and said energizing conductors responsive to simultaneous closure of said second switch and said thermostatically-controlled switch; and pulse-modulation control means including a third switch, coupled to the end of said heating resistor remote from said common connection, operative to provide a signal through said heating resistor independently of the position of said thermostatically-controlled switch, the width of said signal during said heat storage interval being gradually decreased by a related decrease of the duration during which said third switch is closed.

6. An electric heating control arrangement according to claim 5 and further comprising: a first cam means positioned to actuate said second switch and thus determine the duration of said heat storage interval; a second cam means positioned to actuate said third switch and thus govern the pulse width of the signal output of said pulse-modulation control means; and a common driving means including an electric motor for operating said first and second cam means at predetermined intervals.

References Cited in the file of this patent
UNITED STATES PATENTS

| | | |
|---|---|---|
| 2,344,820 | Kearsley | Mar. 21, 1944 |
| 2,425,998 | Crise | Aug. 19, 1947 |
| 2,428,525 | Sterheld | Oct. 7, 1947 |
| 2,570,810 | Hooghkirk | Oct. 9, 1951 |
| 2,727,973 | Collins | Dec. 20, 1955 |